Dec. 20, 1938.     H. W. COLLINS     2,140,689
INSULATED WALL
Filed Sept. 18, 1936

INVENTOR.S
HOWARD W. COLLINS
BY
ATTORNEY.

Patented Dec. 20, 1938

2,140,689

UNITED STATES PATENT OFFICE 2,140,689

INSULATED WALL

Howard W. Collins, Newark, Ohio, assignor, by mesne assignments, to The Ingleside Company, Newark, Ohio, a corporation of Ohio Application September 18, 1936, Serial No. 101,515

2 Claims. (Cl. 20—4)

This invention relates to partitions which are located where there is a temperature differential between opposite sides thereof and in which insulation is provided for retarding the transmission of heat through the partitions.

One of the primary objects of this invention is to provide means for preserving the insulating material by preventing the accumulation of water around the insulation.

Figure 1:
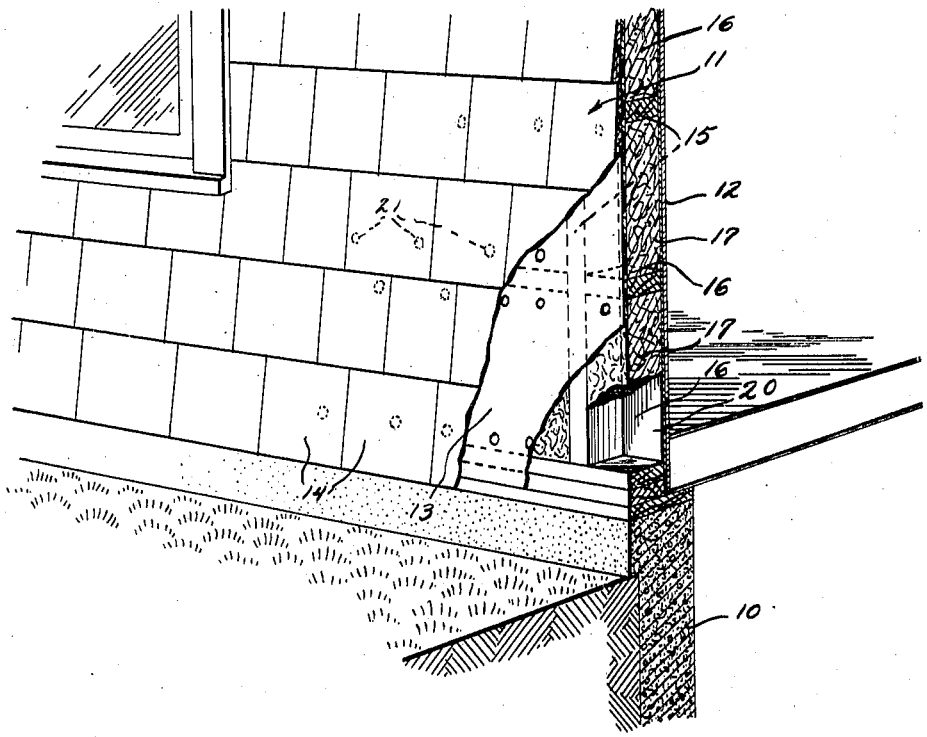
Figure 2:
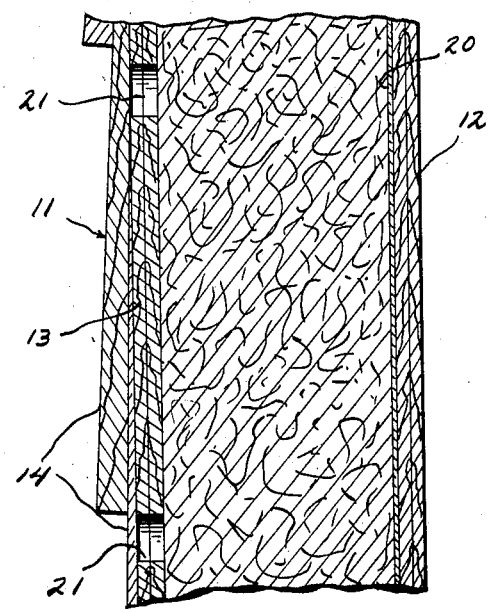

Other objects and advantages of this invention will become more apparent as the following description proceeds, particularly when reference is had to the accompanying drawing wherein Fig. 1 is a perspective view, with parts broken away, of an outside wall constructed in accordance with the teachings of this invention; and Fig. 2 is a fragmentary sectional view taken through the wall shown in Fig. 1.

Since the development of improved means for insulating houses, it has become quite the general practice to fill the space between the inner and outer faces of the walls of houses with an insulating material which may be glass wool, rock wool, or the like.

It has been found from experience that when walls are thus insulated, condensation frequently occurs within the walls ultimately causing the insulating material to be saturated with water. The reason for this condensation occurring will be clearly apparent when it is realized that opposite sides of the insulated wall or partition are subjected to different temperatures. Thus, for example, in the outside wall of a house, the inner surface of the wall is subjected to a relatively warm temperature, while the outer surface thereof is subjected to a relatively cold temperature depending upon the season of the year. The insulation in the space between the inner and outer surfaces of the wall is of course, at a temperature differing from both the inside and outside temperatures.

As the temperatures within or without vary, the air in the insulation expands and contracts and for this reason provision must be made to permit the insulation to "breathe" or, in other words, to draw in and expel air depending upon whether the insulation is contracted or expanded.

If the air is drawn into the interior of the wall from the inside of the house, a situation results where warm humid air enters the wall and when this air reaches a point within the wall where its temperature is substantially lowered, the moisture in the air condenses. Accordingly, the present invention contemplates the provision of a partition or wall structure in which breathing may occur from the outside rather than the inside, since the cold outside air is less humid, the moisture having been frosted or condensed out of it by the outside temperature.

In the drawing wherein one embodiment of the invention is disclosed in detail, the numeral 10 designates the foundation wall of a building, while the numeral 11 designates generally an outer wall structure constructed in accordance with the teachings of this invention. The wall 11 comprises an inner face formed for example, of plywood or the like 12, and an outer surface formed of sheathing 13 and shingles 14. The inner and outer surfaces are spaced apart by the studs 15 to provide a space or chamber 16 which is filled with insulation 17.

The insulation may be of any kind or type desired, fibrous glass wool or rock wool being most frequently used in modern insulating jobs. It is to be understood however, that the material from which the insulation is formed constitutes no part of this invention since any material whatever may be utilized for the purpose of reducing the transmission of heat through the wall.

Under the teachings of this invention, the inner surface 12 of the wall is impervious to the passage of air while the outer surface is provided with means whereby air may be drawn into and expelled from the space 16 within the wall. This may be accomplished by covering the inner face 12 with vapor-proof paper 20 and by providing openings 21 at spaced points in the sheathing 13. It will be noted that the shingles 14 are so arranged that they shield the openings 21 to prevent rain or snow beating in through the same, there still however, being sufficient crevices and the like between the shingles to permit air to pass through the shingles and to the openings 21.

With a wall constructed as above described, it will be apparent that the inner face or surface 12 thereof will be sealed or rendered impervious to the passage of air with the result that no air can be drawn into the space 16 from the interior of the house. The outer face or surface of the wall on the other hand, is provided with positive means whereby cold, relatively dry, air will be drawn into the space 16 when the insulation 17 contracts. It will be obvious that since the cold air is relatively dry, there will be no moisture to be condensed from the same and additionally it will be apparent that since the cold air enters a warmer atmosphere there is no danger that moisture in the air will be condensed. Thus the insulation 17 is permitted to breathe freely without danger of moisture condensing in the space 16 and saturating the insulation.

While in the embodiment of the invention illustrated, the inner surface has been shown as being formed of plywood and sealed by building paper, and the outer surface has been illustrated as comprising sheathing covered by shingles, it is to be understood that the invention is by no means limited to the use of these materials. For example, the sheathing might be formed of perforated gypsum board instead of plywood as illustrated, while the inner surface might be formed of gypsum lath as a plaster base or gypsum board as a finishing material.

In fact any material may be utilized for both the inside and the outside surfaces of the wall insofar as provision is made that the air which is breathed into the space between the surfaces of the wall be relatively cold. Thus, for example, there might be substituted for the paper 20, a metal foil or the inner wall might be covered by suitable wall boards such as sheet rock or, if desired, the inner walls might be formed of sheet metal or any material impervious to the passage of air.

It should be noted further that the invention is not limited to an outside wall structure, but may be incorporated in any partition located where there is a temperature differential between opposite sides thereof. Thus in heated homes, the warm air, because it is lighter, creates a pressure against the upper portions or ceilings of the rooms thus filtering through the inner wall surfaces into the insulation and exaggerating the condition resulting from breathing.

Thus when insulation is placed between the joists in attics, under the teachings of this invention the sealing means which might be vaporproof paper, wall boards or the like, should be placed under the insulation, or in other words, between the insulation and the ceilings of the upstairs rooms of the house. In such cases it will be apparent that it will not be necessary to provide an outside surface or in other words, to cover the insulation since the latter may breathe freely the air from the attic, being wholly exposed on its upper surface.

The invention will find utility further in walls of refrigerators or in fact in any case where a partition or wall separates an area of one temperature from an area of another temperature. In every case, however, provision should be made for the insulation in the wall or partition to breathe relatively cold air rather than warm air, it being apparent that in the case of refrigerators, the breathing should take place through the inner wall rather than through the outer wall.

While the invention has been described with some detail, it is to be understood that the description is for the purposes of illustration only and is not definitive of the limits of the inventive idea, the right being reserved to make such changes in the details of construction and arrangement of parts as will fall within the purview of the attached claims.

What I claim as my invention is:

1. An outer wall structure comprising an inner panel board having one side covered with vaporproof material, an outer panel board provided with a plurality of relatively small openings providing an unobstructed passage of air therethrough and predeterminedly spaced horizontally and vertically with respect to each other so as to prevent a concentration of air at any one point in the wall, studs spacing the inner and outer panel board, insulating material between the inner and outer panel board and finishing material secured to the outer panel board requiring the air to take a circuitous passage through said finishing material while preventing the passage of rain and snow through said openings.

2. An outer wall structure comprising inner and outer panels spaced apart by studding and having insulating material therebetween, said inner panel having substantially impervious means associated therewith to seal said panel against the passage of air therethrough, said outer panel provided with a plurality of small spaced breather openings providing unobstructed passage of air therethrough and predeterminedly spaced horizontally and vertically with respect to each other to prevent a concentration of air at any one point, and finishing material secured to said outer panel preventing the passage of rain and snow therethrough while permitting the passage of air.

HOWARD W. COLLINS.